United States Patent [19]

Frailey

[11] 4,281,220

[45] Jul. 28, 1981

[54] TELEPHONE DIALING AND ANSWERING DEVICE

[76] Inventor: George E. Frailey, R.D. 2, Box 152, New Milford, Pa. 18834

[21] Appl. No.: 121,652

[22] Filed: Feb. 15, 1980

[51] Int. Cl.$^3$ ............................................. H04M 1/31
[52] U.S. Cl. ............................ 179/90 AD; 179/81 R; 179/1 HS
[58] Field of Search .......... 179/90 B, 90 BD, 90 AN, 179/90 AD, 90 AT, 90 R, 1 HF, 1 HS, 162, 81 R

[56] References Cited

U.S. PATENT DOCUMENTS

| | | | |
|---|---|---|---|
| 2,512,931 | 6/1950 | Svoekhotoff | 179/5 R |
| 2,533,234 | 12/1950 | Edwards | 179/6 R |
| 3,170,990 | 2/1965 | Beatty | 179/90 A |
| 3,179,749 | 4/1965 | Snow | 179/1 HS |
| 3,248,481 | 4/1966 | Grote et al. | 179/1 HS |
| 3,274,344 | 9/1966 | Young | 179/90 B |
| 3,384,720 | 5/1968 | Beatty | 179/162 |
| 3,531,599 | 9/1970 | Bodie | 179/90 B |
| 3,581,021 | 5/1971 | Pettit | 179/90 AD |
| 3,612,766 | 10/1971 | Ferguson | 179/81 R |
| 3,715,520 | 2/1973 | Lambrou | 179/90 A |
| 3,725,602 | 4/1973 | Hoffman | 179/90 R |
| 3,833,766 | 9/1974 | Eklof et al. | 179/1 HF |
| 3,848,249 | 11/1974 | Meiri | 340/365 S |
| 3,993,876 | 11/1976 | Davis | 179/90 B |
| 4,010,330 | 3/1977 | Shio | 179/90 B |
| 4,058,686 | 11/1977 | Fleming | 179/90 AD |
| 4,079,196 | 3/1978 | Spanel | 179/1 HS |
| 4,081,623 | 3/1978 | Vogeley | 179/90 BD |
| 4,104,485 | 8/1978 | Pessel et al. | 179/1 HF |

Primary Examiner—Gerald L. Brigance
Attorney, Agent, or Firm—Roylance, Abrams, Berdo & Farley

[57] ABSTRACT

A telephone dialing apparatus includes a housing to enclose the base portion of a telephone, a hook switch operating solenoid in the housing, a motor driven dial-operating drive disc, a switch unit operable by the user and an indicator light. A first switch is operated by the user to activate the telephone and a second switch is operated to energize the dial driving disc and motor. Blinks of the light indicate the extent of dial rotation and the digit to be dialed so that the second switch can be operated repeatedly to dial a sequence of digits forming any telephone number.

5 Claims, 10 Drawing Figures

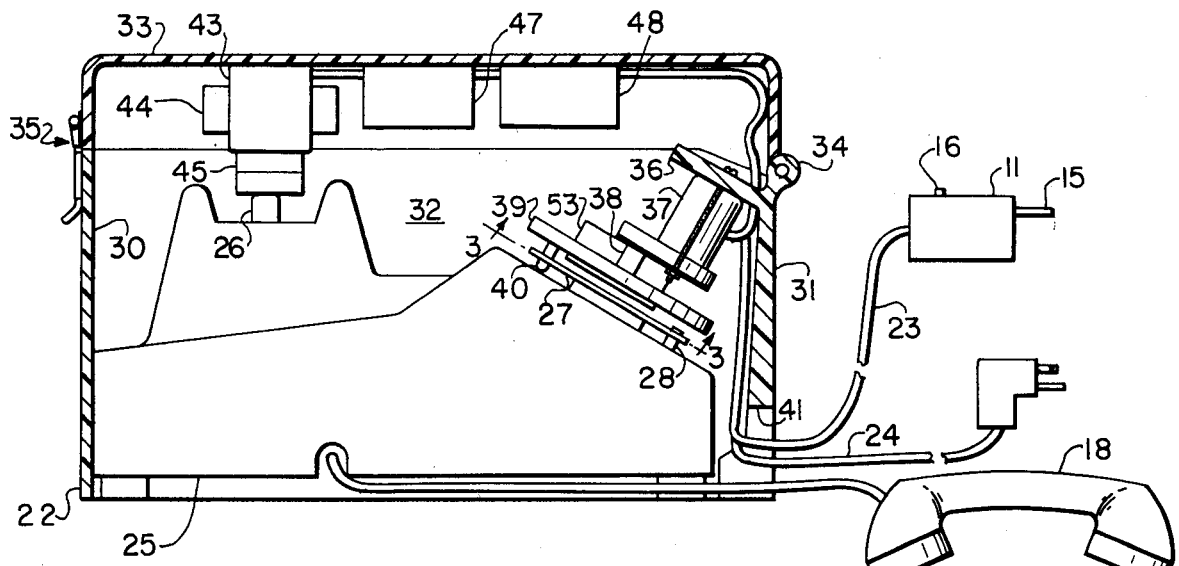
FIG. 2
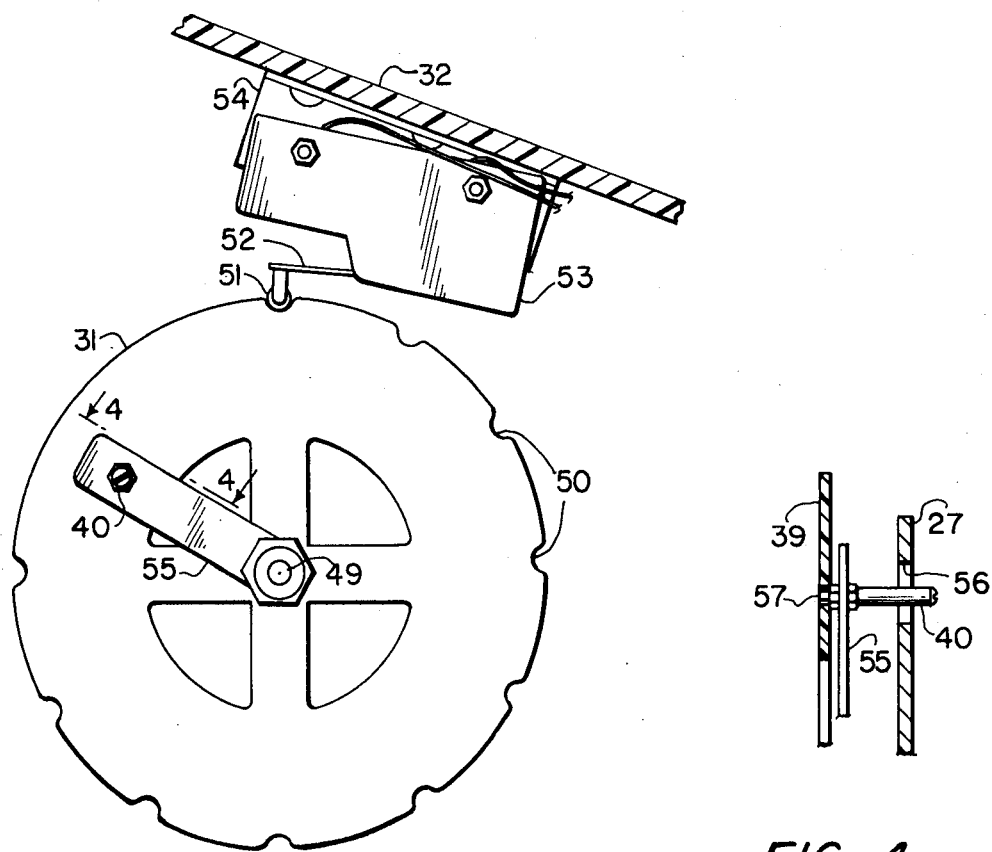
FIG. 3
FIG. 4

TELEPHONE DIALING AND ANSWERING DEVICE

This invention relates to an apparatus for use with a conventional dial telephone to permit full use of the telephone by one having very limited controllable movement of a body part as a result of an injury, illness or other handicap.

BACKGROUND OF THE INVENTION

It has long been recognized that the telephone is an extremely important instrument to one who is partially handicapped as a result of injury or illness and who is therefore restricted in mobility or activity because it permits communication with friends and relatives, a great psychological aid, and with those who can render assistance when needed, a significant safety and comfort factor.

Thus, there have been numerous efforts to provide devices which respond to minimal "signals" from the user to activate and control the telephone. Additionally, there have been devices developed merely as conveniences for telephone use by the non-handicapped. Examples of these efforts are found in the following U.S. Patents:

| | |
|---|---|
| 2,512,981 | Svoekhotoff |
| 2,533,234 | Edwards |
| 3,170,990 | Beatty |
| 3,179,749 | Snow |
| 3,248,481 | Grote et al |
| 3,274,344 | Young |
| 3,319,003 | Prager |
| 3,384,720 | Beatty |
| 3,531,599 | Bodie |
| 3,581,021 | Pettit |
| 3,612,766 | Ferguson |
| 3,715,520 | Lambrou |
| 3,725,602 | Hoffman |
| 3,833,766 | Eklof et al |
| 3,848,249 | Meiri |
| 3,993,876 | Davis |
| 4,010,330 | Shio |
| 4,058,686 | Fleming |
| 4,104,485 | Pessel et al |
| 4,081,623 | Vogeley |
| 4,079,196 | Spanel |

Unfortunately, each of these efforts has one or more disadvantages which limits its practical usefulness in the environment of interest. One of the most common disadvantages is expense, a very important factor for one who, normally, does not have income-earning capacity and must therefore rely on expenditures by family or public institutions who are already under a significant financial burden.

A second, and very significant, disadvantage is the limited capability of some devices to control the telephone. For example, the patent to Beatty shows a device which can be controlled to dial an operator who can then be asked to provide assistance. This is, of course, not usable at all if the person has a handicap which renders his or her voice difficult to understand by those not accustomed to hearing it. But even if the person's voice is not impaired, it requires the time of operators who are already burdened with duties, a trend which should be discouraged. The need to call upon an operator for help is also a psychological barrier to one who has a strong need to do as much as possible without help.

Others of the devices require alteration of the electrical or mechanical equipment of the telephone system itself. This is undesirable because it requires installation by a person having the necessary skills, a cost and convenience factor. It also has the potential for causing other problems in the telephone system and certainly limits the telephone use to one location which could be a serious inconvenience to one who is partly mobile, as by a wheelchair. Such connections are also discouraged by the telephone companies unless their own equipment for this purpose is being used at considerable cost.

BRIEF DESCRIPTION OF THE INVENTION

Accordingly, it is an object of the present invention to provide an apparatus usable by a severely handicapped person to operate a dial telephone without connection to or modification of the standard telephone equipment.

A further object is to provide such a device by which the user can directly dial any desired number without aid.

Another object is to provide such an apparatus which is highly reliable, very simple and quite inexpensive and is therefore of a type which can more readily be made available to handicapped persons.

Briefly described, the invention includes an apparatus for use by a handicapped person to operate a telephone instrument of the type having a handset, a base, means on the base defining a handset receiving location, a hook switch, a hook switch button protruding into the handset receiving location, a dial rotatable in a first direction to select a digit to be selected as part of a number being called, the dial being provided with spring return to generate a signal representative of the selected digit, the dial having angularly spaced finger holes and the base having a finger stop adjacent the dial, the apparatus comprising the combination of a switch unit having first and second manually operable switch means therein and first and second operator arms extending therefrom to facilitate selective operation of said switches by the person; a housing dimensioned to at least partially enclose the base of the telephone; means on said housing for releasing the hook switch button in response to momentary actuation of said first switch; a dial engaging member including a drive pin engaging a finger hole in said dial; a motor supported by said housing and electrically connected to said second switch, said motor having an output shaft coupled to said dial engaging member for rotating said member and said dial during actuation of said second switch; a light; means responsive to rotation of said dial and dial engaging member for energizing said light each time a finger hole reaches said finger stop and for deenergizing said light as the hole passes said stop such that a count of the number of energizations of said light indicates the digit which will be dialed when said second switch is released.

In order that the manner in which the foregoing and other objects are attained in accordance with the invention can be understood in detail, particularly advantageous embodiments thereof will be described with reference to the accompanying drawings, which form a part of this specification, and wherein:

FIG. 2 is a side elevation of a telephone base contained in a housing carrying and connected to operating components in accordance with the invention;

FIG. 3 is a partial bottom plan, in partial section, of the drive disc and switch means portion of the apparatus of FIG. 2 along line 3—3;

FIG. 4 is a partial side elevation, in section, along line 4—4 of FIG. 3;

Figure 1:
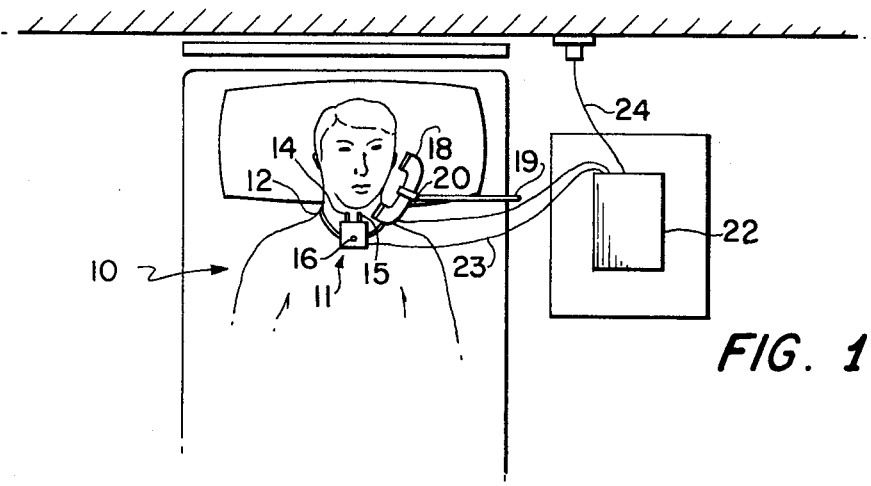
FIG. 1 is a schematic diagram illustrating the general arrangement of major components of an apparatus in accordance with the invention in conjunction with a handicapped person using the apparatus.

Turning now to the drawings, it will be seen that FIG. 1 shows one example of the manner in which the apparatus of the invention can be advantageously employed so that a handicapped person can have full and unaided use of a telephone. As used herein, the term "handicapped person" means one who is or has been afflicted with a disease or suffers from the result of an injury or congenital problem such that he or she is temporarily or permanently deprived of the use of part or substantially all of the body. In the FIG. 1 example, the person 10 will be assumed to be paralyzed and to be capable of only limited head movement, but it will be seen that a patient having rather limited use of, or control over, substantially any movable body member such as a finger, toe or arm will be able to use the device with little or no modification.

The person 10 is supplied with a switch unit 11 which is illustrated as being in the form of a relatively small rectangular box held in a convenient position for use by a neck strap 12. In this example it will be assumed that the person can move his head from side to side and can also tilt his head, or move his jaw, forward and down. Thus, the switch unit is placed on his chest with two protruding switch operator arms 14 and 15 extending toward his neck so that they can be selectively contacted and moved, with very little force, by slight sideways movement of the head and jaw. The switch unit also carries an indicator light 16 which is mounted on the box so as to be within the person's field of view when the switch operator arms are being actuated.

A conventional telephone handset 18 is supported adjacent the person's head by a bracket 19 having a clamp 20 engaging the handset, the other end of the bracket being attachable to the bed frame, a bedside table or other convenient article of furniture. The handset is, of course, connected to a telephone instrument base in the conventional fashion and the base is covered by a housing 22 which contains, in addition to the base, electrical and mechanical components in accordance with the invention which will be described in greater detail. The switch unit is also electrically connected to the housing 22 by a cable 23, and components within the housing are connected to a suitable source of electrical energy, such as a wall outlet by a conductor cable 24.

As will be seen from the following description, once the components have been arranged as shown, or as modified to suit the physical capabilities of the patient, he will have full unassisted use of the telephone by operation of the switch arms 14 and 15 and observation of the light 16. No other controls are necessary. One of the switches is operated to operate the telephone hook switch, thereby obtaining the dial tone, and the other is operated, while observing and counting "blinks" of the indicator light, to dial successive desired digits forming the number being called, as will be described.

FIG. 2 shows, in somewhat greater detail, the housing 22 which is shaped and dimensioned to fit over the base 25 of a telephone instrument. It will be recognized that the instrument is conventional in having a hook switch contained therein (not shown) which is operated by buttons 26 which protrude upwardly into the usual hand-set receiving location. When the buttons are up (released) the hook switch connects the instrument to the telephone line and the instrument is ready for use.

The telephone base also has a dial 27 with ten finger holes, the centers of which are angularly spaced about 30° apart, the holes usually occupying about 300° of the extent of the dial. A finger stop 28 is located about 30° clockwise (as the dial is normally viewed) from the closest hole (the "1" hole). Thus, to dial the digit "1", the dial is rotated about 30° and then released, whereupon the dial is rotated counterclockwise to its starting position by a spring in the base, producing the signal which the system recognizes as the digit "1". To signal a zero, the dial is rotated about 340° and then released.

It appears to be unnecessary to include any further description of the telephone apparatus itself since it is conventional in nature.

Continuing with the description of FIG. 2, it will be seen that the housing 22 is generally rectangular in shape and includes end walls 30 and 31, side walls 32 and a lid 33 which is pivotally connected to end wall 31 by a conventional hinge 34. A latch indicated generally at 35 is provided to keep the lid closed, the latch being of a type commonly used on briefcases or suitcases.

Wall 31 is provided with an inwardly extending support plate 36 which extends inwardly at an angle of approximately 30° with respect to the horizontal such that the lower surface thereof is approximately parallel with the plane containing telephone dial 27. Plate 36 supports a motor 37 which can be a conventional timer motor of the type having a reduction gear box 38 attached to the output shaft thereof. The output shaft of the gear box 38 is coupled to a drive disc 39 such that, upon energization of motor 38, disc 39 is driven in a clockwise direction. The connection between gear box 38 and disc 39 can include a slip clutch so that if disc 39 is mechanically obstructed the motor can continue rotating without damaging effect. A drive pin 40 is attached to disc 39 to be carried by the disc, pin 40 extending from the disc through a finger hole in dial 27 when the housing is placed over a dial telephone. Specifically, when the housing is first placed over a telephone, disc 39 is first rotated to an appropriate position such that pin 40 enters the 0 hole in the dial. It will be observed that, in FIG. 2, the apparatus is not shown with the dial in its rest position, but, instead, is shown partly rotated so that other components of the telephone instrument can be more clearly seen. Normally, the 0 hole will be adjacent finger stop 28 in the rest position of the dial. It will also be recognized that the characteristics of the motor or the slip clutch are such that the spring return mechanism of the dial is capable of returning the dial, pin 40 and disc 39 to the rest position of the dial when the motor is deenergized. If necessary, an additional spring return for the drive disc can be provided.

An opening 41 is provided near the bottom of one of the walls, such as wall 31, to permit the emergence of the multiconductor cables for connecting the telephone and the apparatus within housing 22 to handset 18 and switch unit 11, as well as the plug connected to power cable 24.

The lid of the housing supports a solenoid 43 having a winding 44 and a movable plunger 45 which is disposed over the handset receiving portion of the telephone so as to contact the hook switch buttons 26. The solenoid is selected so that, upon energization, the plunger 45 is moved upwardly, thereby releasing the button and closing the hook switch, providing a dial tone at the handset. The solenoid can also include a spring urging the plunger to its extended position. A solenoid suitable for this purpose is the Model 700-C-200-Al manufactured by the Allen-Bradley Company of Milwaukee, Wis. 53201. The cover 33 also supports a relay 47 and a relay 48. The connection of relays 47 and 48 and solenoid 43 by suitable electrical conductors will be described in connection with the schematic diagrams in FIGS. 8 and 9. A transformer, not illustrated in FIG. 2, can also be attached to the inside of cover 33, depending upon the circuit arrangement employed.

The arrangement and construction of drive disc 39 is more clearly shown in the enlarged view of FIG. 3. As previously indicated, the disc is attached to the output shaft 49 of gear unit 38. The periphery of the drive disc is provided with a series of equally spaced indentations 50 which cooperate with a follower 51 carried by the actuating arm 52 of a switch 53. Switch 53 is supported on a mounting flange 54 which is attached to side wall 32, the contacts of switch 53 being normally closed contacts, i.e., the contacts of the switch are closed when the arm is in its released position which occurs when follower 51 rests in one of depressions 50. As will be recognized, as the disc rotates the follower is pushed radially outwardly with respect to the axis of shaft 49 as the follower rides up onto the peripheral portions of the drive disc between depressions 50. Thus, as the disc rotates, and as the follower enters each of depressions 50, the contacts are momentarily closed. The depressions 50 are separated by angles of 30° so that the position of each depression corresponds to the location of one of the finger holes in dial 27.

Pin 40 is mounted on an arm 55 which is mounted on shaft 49 and coupled to the disc for rotation with the disc. As best seen in FIG. 4, the pin protrudes through a finger hole 56, which, as previously indicated, is the 0 hole of the dial. A mounting screw 57 can be arranged to protrude into disc 39 to guaranty that the pin moves with the disc. As will be recognized, the pin can be directly mounted on the disc, although the arm arrangement permits the disc to be constructed from a lighter, plastic, material.

As will be more fully described, switch 53 is operatively associated with light 16 so that as disc 39 rotates the light is caused to be momentarily energized, indicating the extent of rotation of disc 39 and, therefore, dial 27. A suitable component usable as switch 51 is a Model 311SM7-T switch manufactured by Microswitch, a division of Honeywell, Inc., of Freeport, Ill. 61032.

Figure 5:
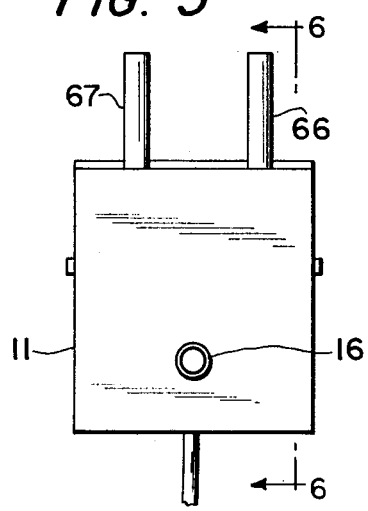
FIG. 5 is a plan view of a control switch unit usable with the apparatus of FIG. 2.
Figure 7:
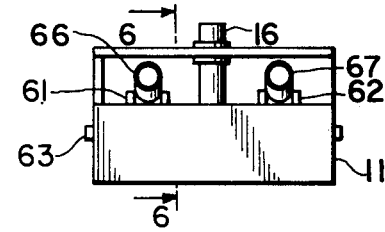
FIG. 7 is a front elevation of the switch unit of FIGS. 5 and 6.
Figure 6:
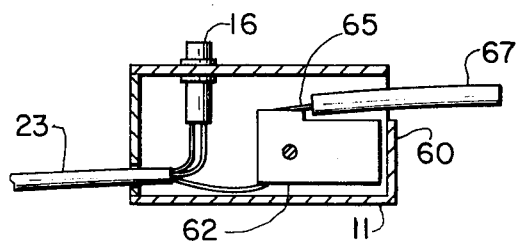
FIG. 6 is a side elevation, in partial section, of the switch unit of FIG. 5.

Switch unit 11 is more fully illustrated in FIGS. 5-7. The switch unit is a relatively simple box structure having side, bottom, top and end walls, one end wall 60 being shortened to leave a rectangular opening therein.

Two sensitive switches 61 and 62 are mounted therein on a shaft 63 extending through the sides of the box such that the operating arms 64 and 65, respectively, extend toward the rectangular opening. Over each operating arm there is placed a tube 66 and 67 of a relatively soft but stiff material, such as a piece of rubber hose of approximately 8 millimeter outer diameter. The lengths of hose are selected so that they protrude somewhat beyond the opening in the end of the box and are contactable by a portion of the body of the user, in this case, the user's chin. Switches 61 and 62 are normally open switches which are closed by depressing the associated ones of tubes 66 and 67. Light 16 is mounted in the top of the switch unit so that it is within the field of view of the user as he operates the switches by jaw or limited head movement. The light and switches are electrically connected to the associated equipment through multiconductor cable 23.

Figure 8:
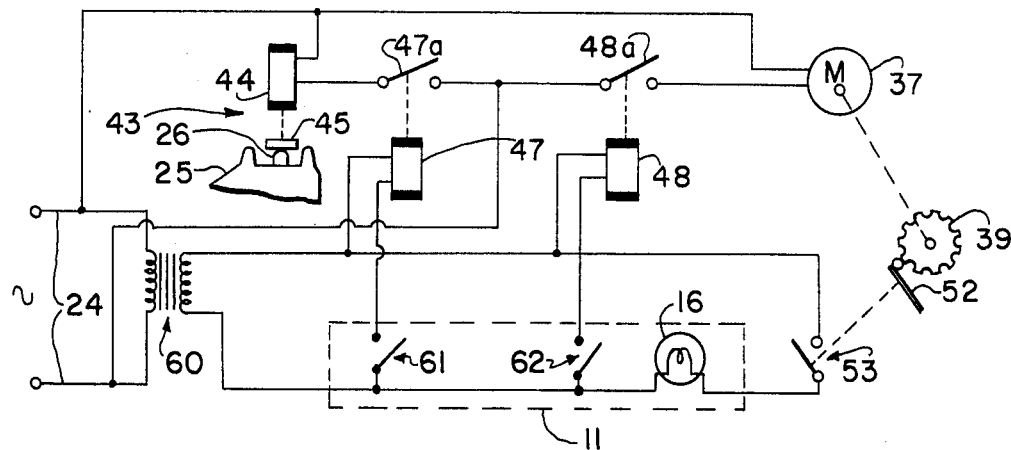
FIG. 8 is a schematic circuit diagram showing the electrical interconnections of components of an apparatus in accordance with the invention.
Figure 9:
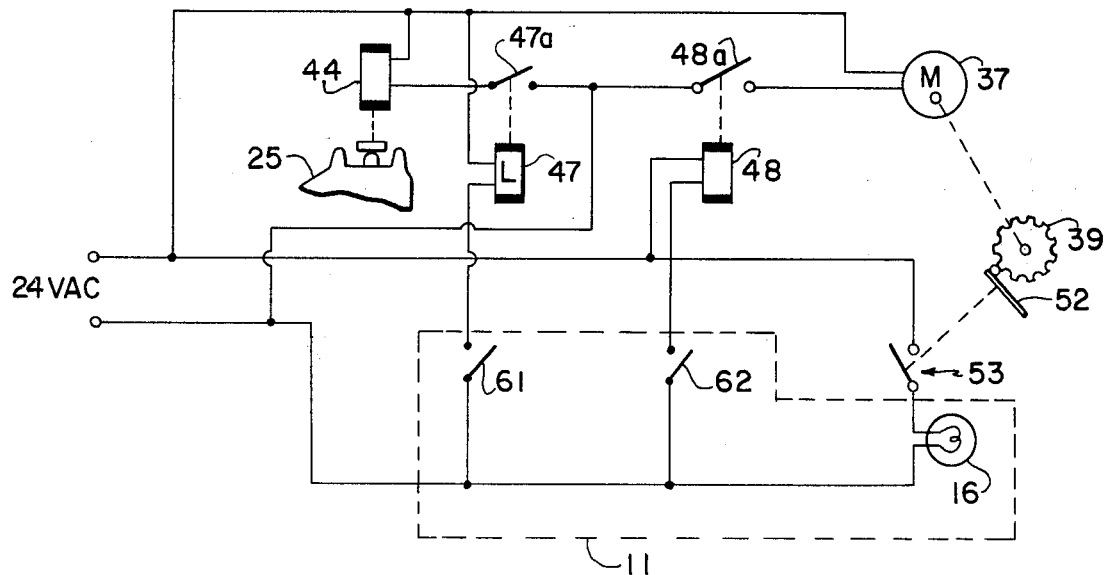
FIGS. 9 and 10 are schematic circuit diagrams showing the electrical interconnections of alternative embodiment of an apparatus in accordance with the invention.

FIGS. 8 and 9 illustrate two embodiments of circuit diagrams, showing the manner in which the components described above can be interconnected for proper operation. In both of these figures, references numerals used above for discussion of the components in FIGS. 1-7 are retained.

As shown in FIG. 8, power cable 24 is connected to live voltage of 115 volts and leads to the primary winding of a step-down transformer indicated generally at 60. One side of the power cable is also connected to one terminal of the winding 44 of solenoid 43 and to one terminal of motor 37. The other terminal of cable 24 is connected to one side of a contact set 47a of relay 47, the other terminal of which is connected to the other terminal of winding 44; and to one terminal of a contact set 48a of relay 48, the other terminal of that contact set being connected to the remaining terminal of motor 37. The secondary winding of transformer 60 produces 24 volts, one terminal of the secondary winding being connected to one terminal of each of the windings of relays 47 and 48 and to one side of switch 53. The other terminal of the secondary winding is connected to one side of each of switches 61 and 62 and, through lamp 16, to the other side of switch 53. The other terminal of switch 61 is connected to the remaining terminal of relay winding 47 and the other terminal of switch 62 is connected to the remaining terminal of relay winding 48. As indicated by the dashed line, switches 61 and 62 and lamp 16 are contained within switch unit 11.

Also as schematically indicated in FIG. 8, the output of motor 37 is mechanically coupled, through the gear arrangement previously discussed, to drive disc 39 and the arm 52 of switch 53, which is mechanically coupled to operate the switch contacts, rides on the periphery of disc 39.

The operation of the apparatus can be seen by considering FIG. 8 in conjunction with FIGS. 1-7. It will be assumed that, initially, cable 24 is connected to the line voltage source and that the switches are in the positions shown. Operation of switch 61 completes a circuit from the secondary of transformer 60 to relay 47, closing contact set 47a and energizing winding 44 of solenoid 43, thereby lifting plunger 45 and releasing button 26, operating the telephone hook switch. A dial tone is thus provided at handset 18. Relay 47 is a latching or bistable relay which operates such that, when initially energized, its contact set 47A is closed and is held closed when power is removed from its energizing winding. The next subsequent energization of the relay 47 winding returns the relay to its original state in which contact set 47a is open. Thus, one closing of switch 61 causes energization of solenoid 43 and holds it in the energized condition until the next actuation of switch 61.

Switch 62 is then operated and held in its closed position, thereby completing a circuit for relay 48, closing contact set 48a and completing the circuit to motor 37. This causes the motor to drive disc 39 and pin 40, rotating the telephone dial. As each finger hole of the telephone dial arrives at finger stop 28, one of the depressions 50 permits arm 52 to move switch 53 to its closed position, completing a circuit through lamp 16, thereby momentarily energizing light 16. If the user wishes to dial the digit 3, it is necessary only for him to keep switch 62 closed until he has seen three illuminations, or blinks, of light 16. He then releases switch 62 which deenergizes relay 48 and motor 37, permitting the spring to return the dial to its starting position, dialing the digit 3. He then closes switch 62 and counts blinks until the total equals the next digit to be dialed, whereupon he releases switch 62, permitting the number to be dialed. This is repeated until the digits forming the desired telephone number have been dialed. Obviously, if the user wishes to dial the operator for assistance or for any other purpose, he simply counts 10 blinks and then releases the switch. As will be recognized, long distance numbers as well as local numbers can be dialed by this sequence.

Upon completion of the call, switch 61 is again closed, reenergizing relay 47 and moving it to its other, stable, position in which contact set 47a is open, solenoid 43 is deenergized and button 26 is depressed, opening the hook switch and deactivating the telephone.

It will be observed that the step-down transformer 60 is used as a safety feature. It is highly undesirable, for safety reasons, to provide a switch unit in intimate contact with a hospital patient if the full line voltage is available at the switches. Thus, that portion of the circuit involving the switch unit 11 is supplied only with 24 volts. In this circuit, a relay suitable for use as relay 47 is the Model S89R5ABD1-120 manufactured by Potter & Brumfield, a division of AMF Incorporated, Princeton, Ind. 47671. Relay 48 can be a Model 8501-60-2 relay manufactured by Square D Company, Park Ridge, Ill. 60068. Motor 37 can be a Model R.G. 21-090 motor manufactured by General Time Corporation, Thomaston, Conn. 06787. Switches 61 and 62 can be Model B1-2RW865-A2 microswitches manufactured by Microswitch, a division of Honeywell, Inc. of Freeport, Ill. 61032.

There are circumstances under which the entire system can be supplied from a 24 volt supply, and in which no transformer is thus necessary. A circuit of this type is shown in FIG. 9. The basic difference between the circuits of FIG. 8 and FIG. 9 is the absence of the step-down transformer. Otherwise, the circuit is substantially the same and the operation of the circuit is identical. It would, of course, be necessary for use of the circuit of FIG. 9 to obtain a motor 37 and a solenoid 44 which are operable at 24 volts and have the necessary mechanical characteristics.

Figure 10:
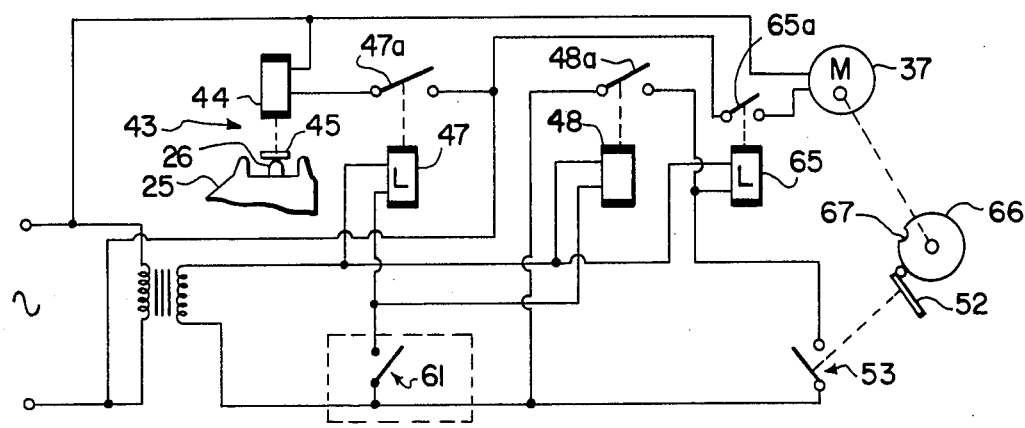

FIG. 10 shows a further embodiment of an apparatus which incorporates some of the principles of the invention but which is used in a different fashion. This embodiment is intended for use by those who are so limited in their body movement that it is not possible for them to selectively operate two switches but who can operate one switch. The transformer, solenoid 43 and relay 47 are provided as described in connection with FIG. 9, but only switch 61 is provided. Switch 62 and lamp 16 are omitted. Contact set 47a is connected in series with a contact set 65a of a latching relay 65 and in series with the motor. Also, the winding of relay 48 is connected in parallel with the winding of relay 47 so that both relays 47 and 48 are energized by the momentary closing of switch 61. This energizes solenoid 43 (which is held energized by latching relay 47) and also actuates relay 65 to its "latched" position in which contact set 65a is closed. Motor 37 is thus energized.

The disc 66 which is driven by motor 37 also differs frm disc 39 in that it has only one depression 67 which is located so that follower 52 enters the depression and closes switch 53 when the "zero" hole in the telephone dial reaches the finger stop. The closing of switch 53 re-energizes relay 65, causing it to switch to its other stable condition in which contact set 65a is open. The motor is thus deenergized and the dial is allowed to return to its original position, thereby dialing "operator". The user can then give the operator the desired number or ask for help, as needed.

While the embodiment of FIG. 10 is clearly more limited in that the user is not able to dial any number unassisted, it provides a usable apparatus for those with more restricted body movement.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for use by a handicapped person to operate a telephone instrument of the type having a handset, a base, means on the base defining a handset receiving location, a hook switch, a hook switch button protruding into the handset receiving location, a dial rotatable in a first direction to select a digit to be selected as part of a number being called, the dial being provided with spring return to generate a signal representative of the selected digit, the dial having angularly spaced finger holes and the base having a finger stop adjacent the dial, the apparatus comprising the combination a switch unit having first and second manually operable switch means therein and first and second operator arms extending therefrom to facilitate selective operation of said switches by the person;

a housing dimensioned to at least partially enclose the base of the telephone;

means on said housing for releasing the hook switch button in response to momentary actuation of said first switch;

a dial engaging member including a drive pin engaging a finger hole in said dial;

a motor supported by said housing and electrically connected to said second switch, said motor having an output shaft coupled to said dial engaging member for rotating said member and said dial during actuation of said second switch;

a light;

means responsive to rotation of said dial and dial engaging member for energizing said light each time a finger hole reaches said finger stop and for deenergizing said light as the hole passes said stop such that a count of the number of energizations of said light indicates the digit which will be dialed when said second switch is released.

2. An apparatus for use by a handicapped person to operate a dial telephone instrument of the type having a handset, a base having a spring-return rotatable dial and a handset-receiving location thereon, and at least one hook switch button which is normally depressed when the handset is placed in its receiving location, the apparatus comprising a housing dimensioned to fit over and at least partially enclose the base of the telephone instrument with the handset removed therefrom, said housing having a top portion lying above said base, side walls, and means defining at least one aperture through said side walls to permit passage therethrough of electrical conductors;

solenoid means mounted in said housing for operating said hook switch button, said solenoid means having a member movable between a hook switch depressing position and a hook switch releasing position upon deenergization and energization, respectively, of said solenoid means;

circuit means connectable to a source of electrical energy;

a motor carried by said housing;

drive disc means carried by said housing and coupled to said motor to be rotatably driven thereby for operating said telephone dial, said disc means being in substantially parallel, coaxial relationship with the telephone dial when said housing is over said base;

a drive pin mounted for rotation with said disc means and protruding axially therefrom into a finger hole in said telephone dial;

an indicator light;

first switch means operatively associated with said drive disc means for periodically completing an electrical circuit including said indicator light and said circuit means as said drive disc means rotates and for energizing said light and thereby providing a visible indication of each circuit completion by said first switch means;

second switch means manually operable by the person and electrically connected to said solenoid means and said circuit means for energizing and deenergizing said solenoid means to respectively depress and release said hook switch button; and third normally open switch means manually operable by the person and electrically connected to said motor and said circuit means for energizing said motor such that said motor is energized and said disc is driven only while said third switch means is closed, whereby operation of said third switch means permits the person to count visible indications of said light and thereby select the digit to be dialed by causing rotation of said motor, said drive disc and said dial in a first direction, said indicator light being energized a number of times equal to the integer next smaller than the total angular rotation of the disc and dial during operation of said third switch means divided by the angular separation between the centers of the finger holes in the dial, that integer being representative of the digit to be dialed when said third switch means is released and said dial returns to its starting position.

3. An apparatus according to claim 2 wherein said drive disc means includes a substantially circular disc having at least ten radial indentations in the edge thereof, the centers of said indentations being separated from each other by angles of about 30°;

and wherein said first switch means includes a switch having a normally open contact set and an operating arm for closing said contact set, said switch being mounted in said housing with said arm in contact with said edge of said disc such that, upon rotation of said disc, a portion of said arm successively enters said indentations and closes said contact set.

4. An apparatus according to claim 2 and further comprising a second housing; and wherein said second and third switch means each includes a manually operatable switch mounted in said second housing, each said switch having a normally open contact set and an operating arm extending from said second housing in a position to be manually depressed by the person.

5. An apparatus for use by a handicapped person to operate a dial telephone instrument of the type having a handset, a base having a spring-return rotatable dial, a finger stop adjacent the dial, and a handset-receiving location thereon, and at least one hook switch button which is normally depressed when the handset is placed in its receiving location, the apparatus comprising a housing dimensioned to fit over and at least partially enclose the base of the telephone instrument with the handset removed therefrom, said housing having a top portion lying above said base, side walls, and means defining at least one aperture through said side walls to permit passage therethrough of electrical conductors;

solenoid means mounted in said housing for operating said hook switch button, said solenoid means having a member movable between a hook switch depressing position and a hook switch releasing position upon deenergization and energization, respectively, of said solenoid means;

circuit means connectable to a source of electrical energy;

a motor carried by said housing;

drive disc means carried by said housing and coupled to said motor to be rotatably driven thereby for operating said telephone dial, said disc means being in substantially parallel, coaxial relationship with the telephone dial when said housing is over said base;

a drive pin mounted for rotation with said disc means and protruding axially therefrom into the zero finger hole in said telephone dial;

first bistable relay means having a contact set connected to said circuit means and said solenoid means for energizing said solenoid means when in one of its stable states;

first switch means manually operable by the person and electrically connected to said first bistable relay means and said circuit means for energizing and deenergizing said solenoid means to respectively depress and release said hook switch button;

second bistable relay means having a contact set connected to said circuit means and said motor for energizing said motor when in one of its stable states;

third relay means connected to said first switch means and said circuit means and having a contact set connected to said circuit means and said second bistable relay means for energizing said second relay means; and second switch means in parallel circuit relationship with the contact set of said third relay means for operating said second relay means and deenergizing said motor when said pin drives said zero hole to a location adjacent said finger stop, means to respectively depress and release said hook switch button; and third normally open switch means manually operable by the person and electrically connected to said motor and said circuit means for energizing said motor such that said motor is energized and said disc is driven only while said third switch means is closed, whereby operation of said third switch means permits the person to count visible indications of said light and thereby select the digit to be dialed by causing rotation of said motor, said drive disc and said dial in a first direction, said indicator light being energized a number of times equal to the integer next smaller than the total angular rotation of the disc and dial during operation of said third switch means divided by the angular separation between the centers of the finger holes in the dial, that integer being representative of the digit to be dialed when said third switch means is released and said dial returns to its starting position.

* * * * *